US012506883B2

(12) United States Patent
Zhao et al.

(10) Patent No.: US 12,506,883 B2
(45) Date of Patent: Dec. 23, 2025

(54) TEMPLATE MATCHING FOR MULTIPLE REFERENCE LINE INTRA PREDICTION

(71) Applicant: Tencent America LLC, Palo Alto, CA (US)

(72) Inventors: Xin Zhao, Santa Clara, CA (US); Guichun Li, San Jose, CA (US); Lien-Fei Chen, Hsinchu (TW); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 147 days.

(21) Appl. No.: 18/207,587

(22) Filed: Jun. 8, 2023

(65) Prior Publication Data

US 2024/0022738 A1   Jan. 18, 2024

Related U.S. Application Data

(60) Provisional application No. 63/388,909, filed on Jul. 13, 2022.

(51) Int. Cl.
*H04N 19/184* (2014.01)
*H04N 19/176* (2014.01)
*H04N 19/593* (2014.01)

(52) U.S. Cl.
CPC ......... *H04N 19/184* (2014.11); *H04N 19/176* (2014.11); *H04N 19/593* (2014.11)

(58) Field of Classification Search
CPC ... H04N 19/184; H04N 19/176; H04N 19/593
See application file for complete search history.

(56) References Cited

U.S. PATENT DOCUMENTS 9,363,511 B2   6/2016   Zhang et al.
9,769,472 B2   9/2017   Liu et al.
(Continued)

FOREIGN PATENT DOCUMENTS

JP   2012-532501 A   12/2012
JP   2019-535211 A   12/2019
JP   2021-518059 A   7/2021

OTHER PUBLICATIONS

High Efficiency Video Coding, Rec. ITU-T H.265 v4 Dec. 2016, pp. 1-664.
(Continued)

*Primary Examiner* — Kyle M Lotfi
(74) *Attorney, Agent, or Firm* — ArentFox Schiff LLP

(57) ABSTRACT

Processing circuitry receives a video bitstream comprising a current coding block in a picture coded in a template-based multiple reference line intra prediction (TMRL) mode. The processing circuitry determines combinations of reference lines and intra prediction modes for the current coding block. A first combination in the combinations includes a first reference line and a first intra prediction mode. For the first combination, the processing circuitry calculates template entry delta values respectively associated with entries of a template of the current coding block based on the first reference line and the first intra prediction mode, and calculates a first template matching cost value by unequal weighting of the template entry delta values. The processing circuitry sorts the combinations according to template matching cost values respectively associated with the combinations, selects a specific combination from the sorted combinations, and reconstructs the current coding block according to the specific combination.

13 Claims, 14 Drawing Sheets

(56) References Cited

U.S. PATENT DOCUMENTS 10,419,754 B1 * 9/2019 Zhao ............... H04N 19/11
2023/0217019 A1 * 7/2023 Teng ............... H04N 19/176
375/240.12

OTHER PUBLICATIONS

B. Bross, J. Chen, S. Liu, "Versatile Video Coding (Draft 2)", ISO/IEC JTC1/SC29/WG11 JVET-K1001, Jul. 2018, pp. 1-139.

Zhang, Ximin, et al. Non-CE6: Intra mode coding with fixed length binarization. Joint Collaborative Team on Video Coding (JCT-VC) of ITU-T SG16 WP3 and ISO/IEC JTC1/SC29/WG11, 8th Meeting, JCTVC-H0435. Feb. 2012, pp. 1-5.

Y.-J. Chang et al., "Multiple Reference Line Coding for Most Probable Modes in Intra Prediction," 2019 Data Compression Conference (DCC), 2019, pp. 559-559, doi: 10.1109/DCC.2019.00071.

B. Bross et al., CE3: Multiple reference line intra prediction (Test 1.1.1, 1.1.2, 1.1.3 and 1.1.4), document JVET-L0283 of JVET, Oct. 2018, pp. 1-7.

L. Xu, Y. Yu, H. Yu, D. Wang, "Non-EE2: Template-based multiple reference line intra prediction," Joint Video Experts Team (JVET) of ITU-T SG 16 WP 3 and ISO/IEC JTC 1/SC 29, Doc. JVET-AA0120, 27th Meeting, by teleconference, Jul. 13-22, 2022, pp. 1-5.

Office Action received for Japanese Patent Application No. 2024-547009, mailed on Jul. 15, 2025, 23 pages (13 pages of English Translation and 10 pages of Original Document).

Xu et al., "Non-EE2: Template-based multiple reference line intra prediction", OPPO, Joint Video Experts Team (JVET) of ITU-T SG 16 WP 3 and ISO/IEC JTC 1/SC 29 27th Meeting, by teleconference, Jul. 13-22, 2022, Document: JVET-AA0120-v1, Jul. 2022, pp. 1-5.

* cited by examiner

- If (leftIntraDir == aboveIntraDir && leftIntraDir > DC_IDX)
  ○ MPM [0] = leftIntraDir;
  ○ MPM [1] = ((leftIntraDir + offset) % mod) + 2;
  ○ MPM [2] = ((leftIntraDir - 1) % mod) + 2;
- Else if (leftIntraDir == aboveIntraDir)
  ○ MPM [0] = PLANAR_IDX;
  ○ MPM [1] = DC_IDX;
  ○ MPM [2] = VER_IDX;
- Else if (leftIntraDir != aboveIntraDir)
  ○ MPM [0] = leftIntraDir;
  ○ MPM [1] = aboveIntraDir;
  ○ If (leftIntraDir > 0 && aboveIntraDir > 0)
    - MPM [2] = PLANAR_IDX;
  ○ Else
    - MPM [2] = (leftIntraDir + aboveIntraDir) < 2 ? VER_IDX : DC_IDX;

*FIG. 6*

| Index | Bin string (prefix) | Bin string (suffix) |
|---|---|---|
| 0 | 0 | 00 |
| 1 | 0 | 01 |
| 2 | 0 | 10 |
| 3 | 0 | 11 |
| 4 | 10 | 00 |
| ... | ... | |
| 18 | 1111 | 10 |
| 19 | 1111 | 11 |

FIG. 9

TEMPLATE MATCHING FOR MULTIPLE REFERENCE LINE INTRA PREDICTION

INCORPORATION BY REFERENCE

The present application claims the benefit of priority to U.S. Provisional Application No. 63/388,909, "Template matching for multiple reference line intra prediction" filed on Jul. 13, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and apparatuses for video encoding/decoding. In some examples, an apparatus for video decoding includes receiving circuitry and processing circuitry. The processing circuitry receives a video bitstream comprising a current coding block in a picture and determines that the current coding block is coded in a template-based multiple reference line intra prediction (TMRL) mode. The processing circuitry determines combinations of reference lines and intra prediction modes for an intra prediction of the current coding block in the picture. A first combination in the combinations includes a first reference line in the reference lines and a first intra prediction mode in the intra prediction modes. The first reference line is a non-adjacent reference line. For the first combination, the processing circuitry calculates template entry delta values respectively associated with entries of a template of the current coding block based on the first reference line and the first intra prediction mode, and calculates a first template matching cost value associated with the first combination by unequal weighting of the template entry delta values. The template of the current coding block is in an adjacent reference line. The processing circuitry sorts the combinations of the reference lines and the intra prediction modes according to template matching cost values respectively associated with the combinations. The template matching cost values associated with the combinations includes the first template matching cost value associated with the first combination. The processing circuitry selects a specific combination from the sorted combinations, and reconstructs the current coding block according to the specific combination.

In some examples, the template of the current coding block comprises neighboring samples to the current coding block as the entries, and the processing circuitry determines a reference template in the first reference line corresponding to the template of the current coding block based on the first intra prediction mode, the reference template includes reference entries respectively corresponding to the entries of the template.

Further, in some examples, the processing circuitry calculates a first template entry delta value as a difference between a first entry in the entries of the template and a first reference entry in the reference entries of the reference template, the first reference entry corresponds to the first entry. The processing circuitry determines a weight for weighting the first template entry delta value based on at least the first entry and the first reference entry.

In some examples, the processing circuitry determines the weight for weighting the first template entry delta value based on the first entry, the first reference entry and one or more adjacent reference entries of the first reference entry.

In some examples, the processing circuitry determines the weight for weighting the first template entry delta value based on the first template entry delta value and one or more template entry delta values associated with adjacent entries of the template.

In some examples, the processing circuitry determines the weight for weighting the first template entry delta value based on at least a first gradient value at the first entry and/or a second gradient value at the first reference entry.

In some examples, the processing circuitry calculates the first template matching cost value associated with the first combination based on a portion of the template.

In an example, the processing circuitry calculates the first template matching cost value based on an above template that includes above neighboring samples of the current coding block.

In an example, the processing circuitry calculates the first template matching cost value based on a left template that includes left neighboring samples of the current coding block.

In some examples, the processing circuitry determines a subset of the combinations based on a predefined range for the template matching cost values, and selects the specific combination from the subset of the combinations.

In an example, the processing circuitry selects a first subset of the combinations with first template matching cost values in the predefined range, and in response to a first number of combinations in the first subset of the combinations being less than a specific number specifying a number requirement of available combinations, selects one or more second combinations with second template matching cost values out of the predefined range, the first subset and the one or more second combinations form the subset of the combinations with a number of combinations in the subset being equal to the specific number.

In another example, the processing circuitry selects a first subset of the combinations with first template matching cost values in the predefined range, and in response to a first number of combinations in the first subset of the combinations being greater than a specific number specifying a number requirement of available combinations, selects, from the first subset of the combinations, the subset of the combinations, a number of combinations in the subset is equal to the specific number. For example, the processing circuitry selects the subset of the combinations with lowest template matching cost values, or selects the subset of the combinations with closest reference lines to the template.

In some examples, the template is in a second reference line, and the processing circuitry determines that a projection point of an entry of the template is at a fractional position between two samples in the first reference line, and generates a reference entry associated with the entry of the template according to an interpolation based on at least the two samples.

In some examples, to select the specific combination, the processing circuitry decodes an index from a bitstream with the picture encoded in the bitstream, the index is indicative of the specific combination from the sorted combinations.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 6 shows pseudo codes for generating a most probable mode list in some examples.

FIG. 9 show a table of a binarization process and the codewords in the template based multiple reference line intra prediction mode in some examples.

DETAILED DESCRIPTION OF EMBODIMENTS

Figure 1:
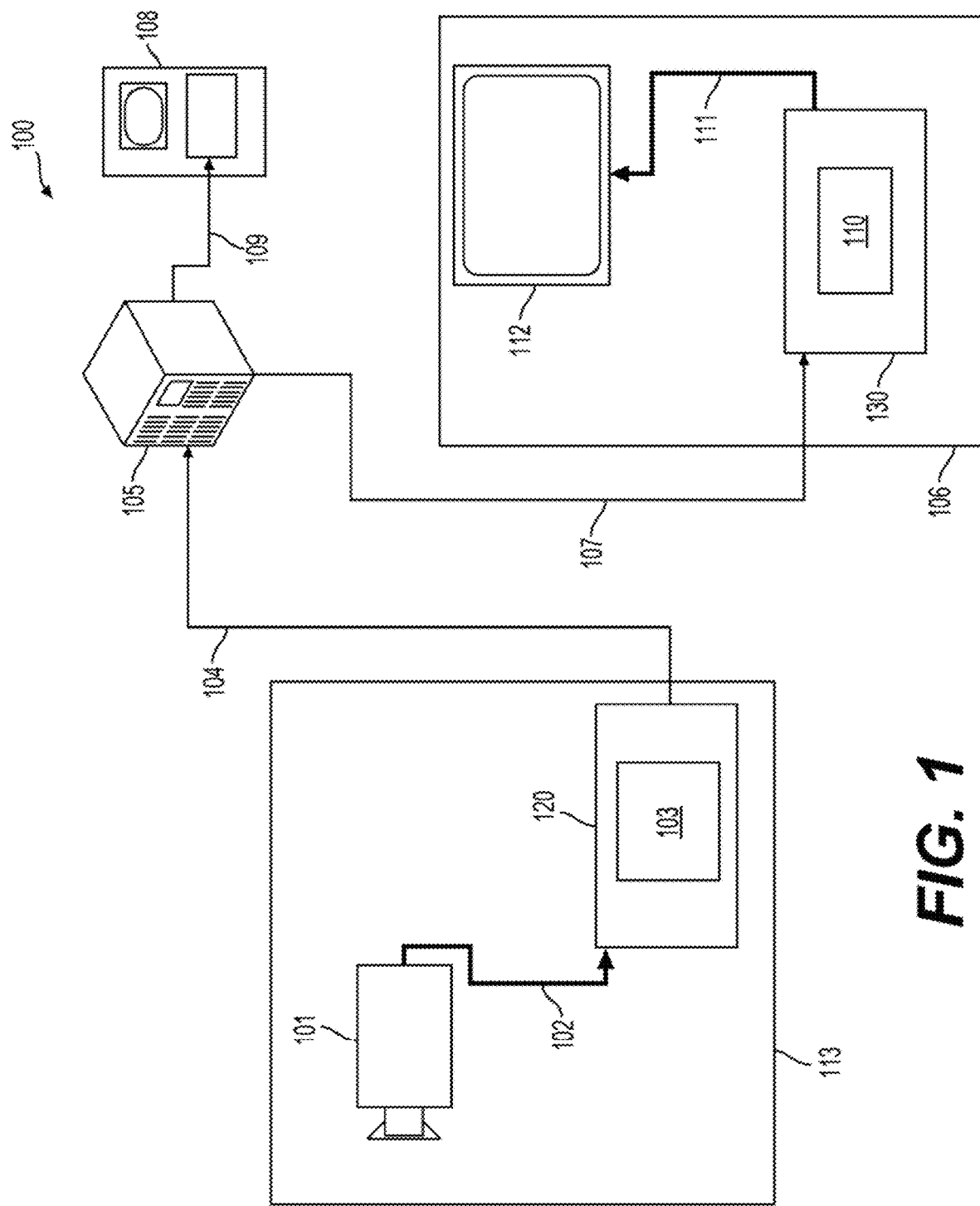
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) include a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
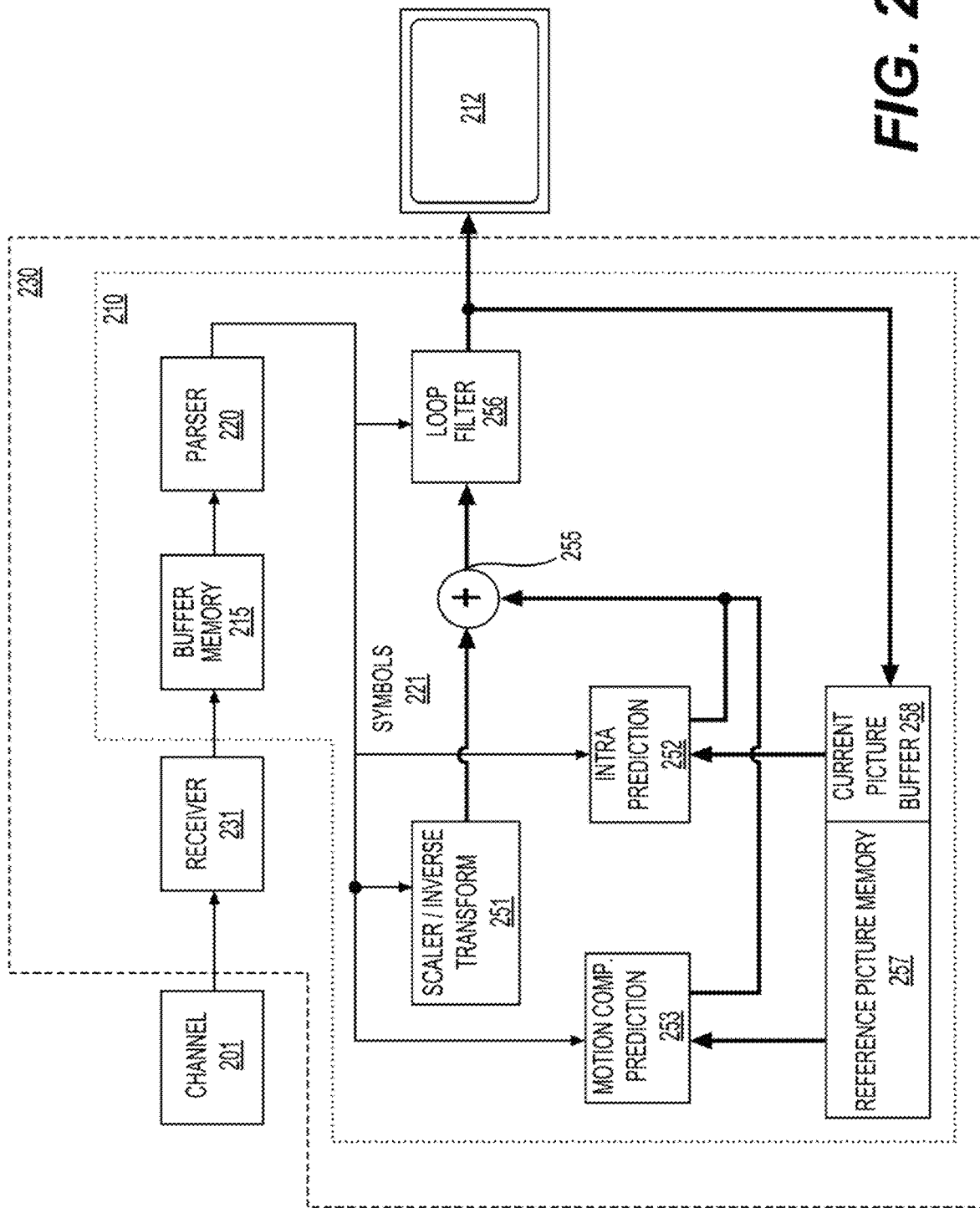
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
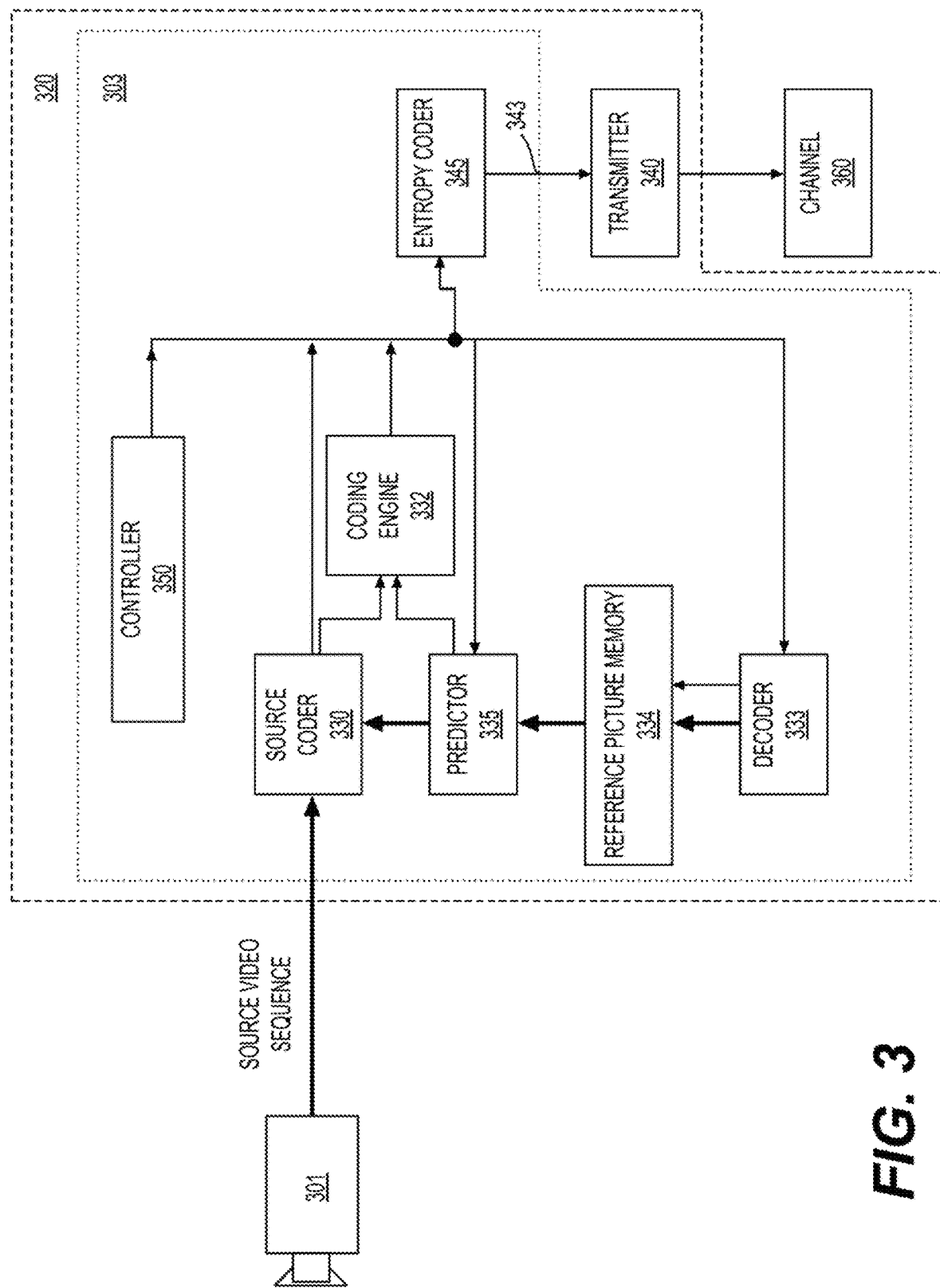
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques of template matching for multiple reference line intra prediction.

Figure 4:
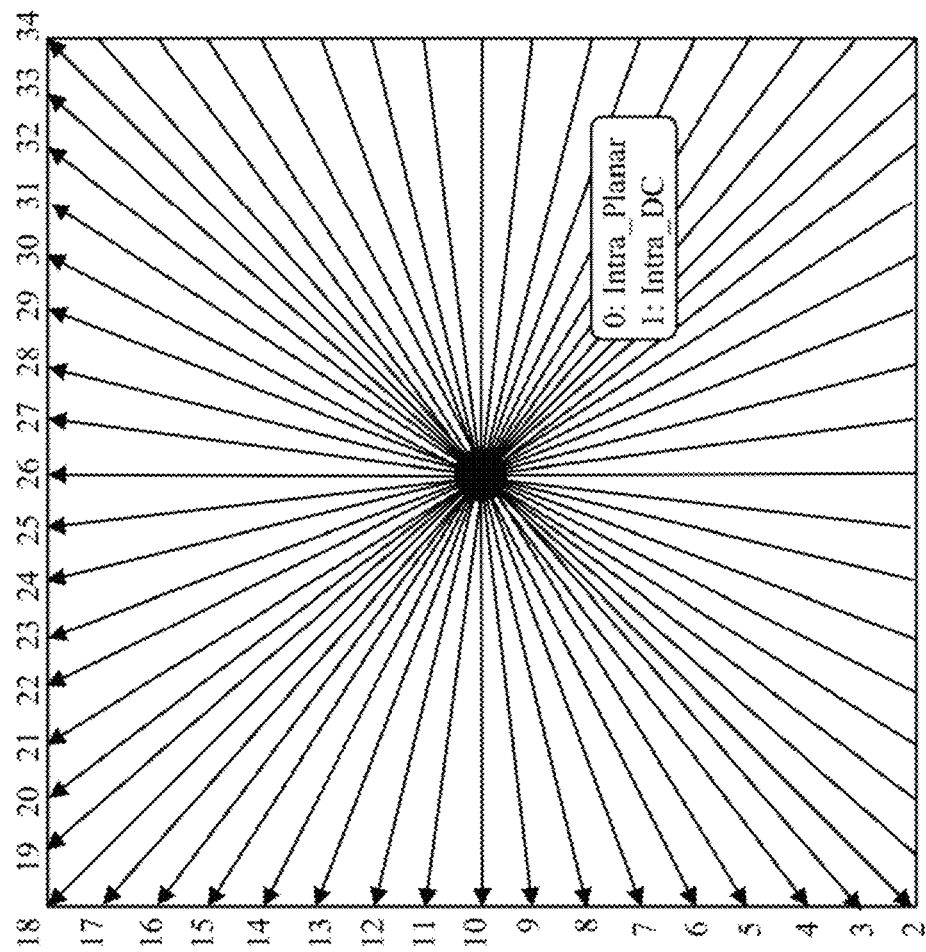
FIG. 4 shows a diagram of intra prediction modes in some examples.

FIG. 4 shows a diagram of intra prediction modes in some examples, such as HEVC. For example, HEVC uses a total of 35 intra prediction modes (e.g., mode 0 to mode 34). Among the 35 intra prediction modes, some modes are directional modes and some modes are non directional modes. In some examples, mode 0 and mode 1 are non directional modes, for example, mode 0 is a planar mode, and mode 1 is DC mode. Further, mode 2 to mode 34 can be directional modes, for example, mode 10 is horizontal mode, mode 26 is vertical mode, and mode 2, mode 18 and mode 34 are diagonal modes, and the like. Values of samples in a coding block are determined according to the neighboring references samples in the same picture and the intra prediction mode of the coding block. In an example, in the DC mode, a mean value is calculated by averaging reference samples in the same picture and can be used for flat surfaces. In another example, in the planar mode, the value of each sample in the coding block is calculated assuming an amplitude surface with a horizontal and vertical smooth gradient derived from the boundaries samples of the neighboring blocks. In some examples, the reference samples include neighboring samples in a row immediately above the coding block and/or include neighboring samples in a column immediately left of the coding block.

In some examples, the intra prediction modes are signaled based on a list of most probable modes (MPMs), and remaining modes. For example, for a coding block, an MPM list is determined. In an example, the MPM list includes 3 modes from the 35 intra prediction modes. Then, when the specific intra prediction mode of the coding block is one of the 3 modes in the MPM list, an index indicative of the one of the 3 modes is used for signaling. When the specific intra prediction mode of the coding block is not one of the 3 modes in the MPM list, an index indicative of one from the remaining modes (32 modes) is used for signaling. In some examples, the MPM list can include other suitable number of modes, such as 6, 10, and the like.

It is noted other suitable number of intra prediction modes can be used.

Figure 5:
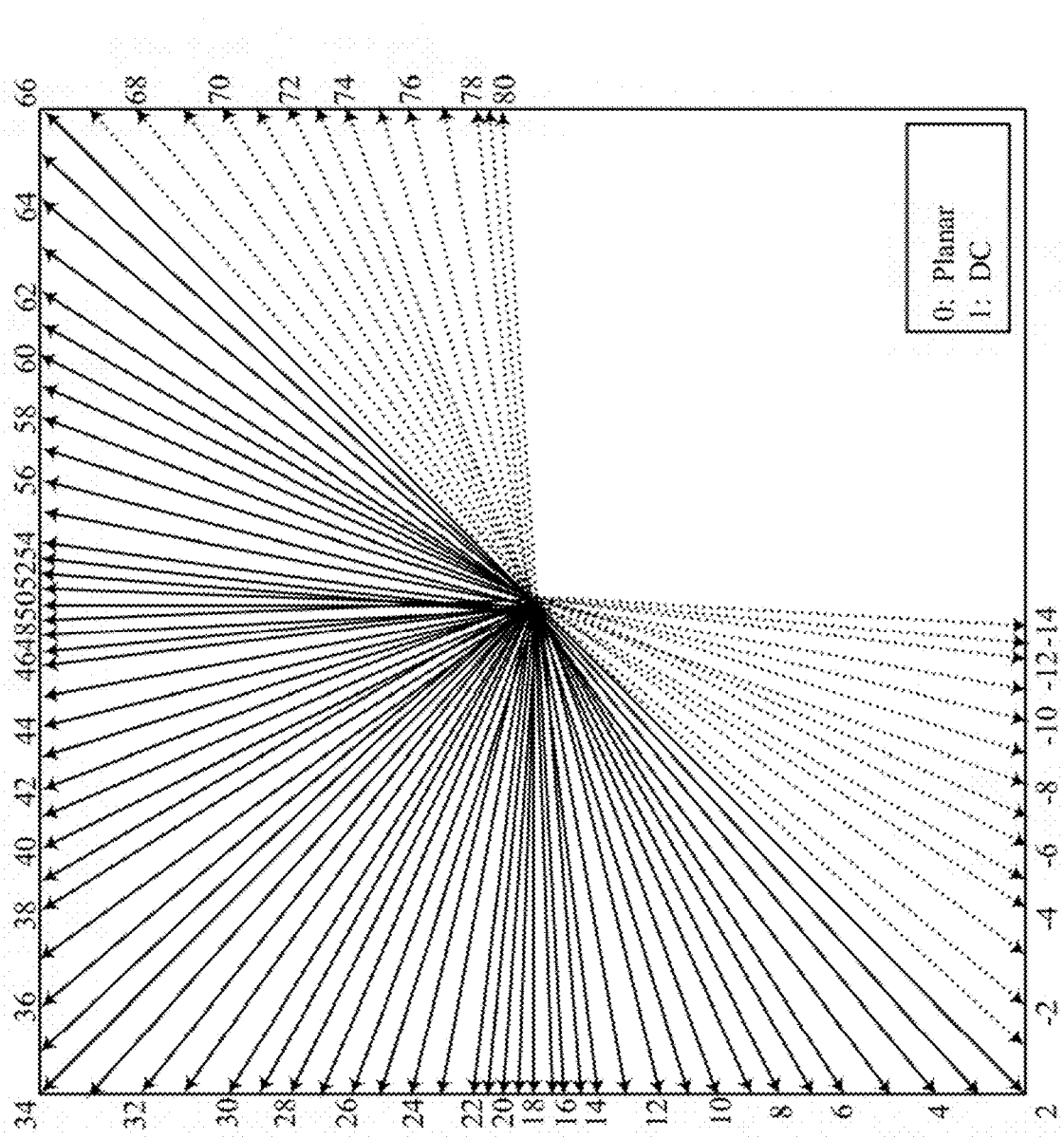
FIG. 5 shows a diagram of intra prediction modes in some examples.

FIG. 5 shows a diagram of intra prediction modes in some examples, such as VVC. In some examples, VVC can use a total of 95 intra prediction modes, such as mode −14 to mode 80. Among the 95 intra prediction modes, mode 0 is a planar mode, mode 1 is DC mode, mode 18 is horizontal mode, mode 50 is vertical mode, and mode 2, mode 34 and mode 66 are diagonal modes. Modes −1 to −14 and modes 67 to 80 are referred to wide-angle intra prediction (WAIP) modes in some examples.

In some examples, to code an intra mode (also referred to as intra prediction mode) of a coding block (e.g., a luma block, chroma blocks of a coding unit), a most probable mode (MPM) list of size 3 is built based on the intra modes of the neighboring blocks of the coding block. The MPM list can be referred to as the MPM list or primary MPM list. If the intra mode of the coding block is not from the MPM list, a flag is signaled to indicate whether intra mode belongs to the selected modes in the MPM list.

FIG. 6 shows pseudo codes for generating an MPM list in some examples. In the FIG. 6 example, leftIntraDir is used to indicate the intra mode of a left block (neighboring to the current coding block) and aboveIntraDir is used to indicate the intra mode of the above block (neighboring to the current coding block). In an example, when left or above block is currently not available, leftIntraDir or aboveIntraDir can be set to DC_IDX (index of the DC mode). In some examples, the variables "offset" and "mod" in FIG. 6 are the constant values, which are set to 29 and 32 respectively.

In some related examples, the reference samples for intra prediction of a coding block are located in immediately next to the coding block. The neighboring portion to the coding block that is formed by the reference samples can be referred to as a reference line.

According to an aspect of the disclosure, techniques that are referred to as multi-line intra prediction can use more reference lines for intra prediction. In some examples, the encoder decides and signals which reference line is used to generate the intra predictor. In an example, the reference line index is signaled before intra prediction mode, and only the most probable modes are allowed in case a nonzero reference line index is signaled.

Figure 7:
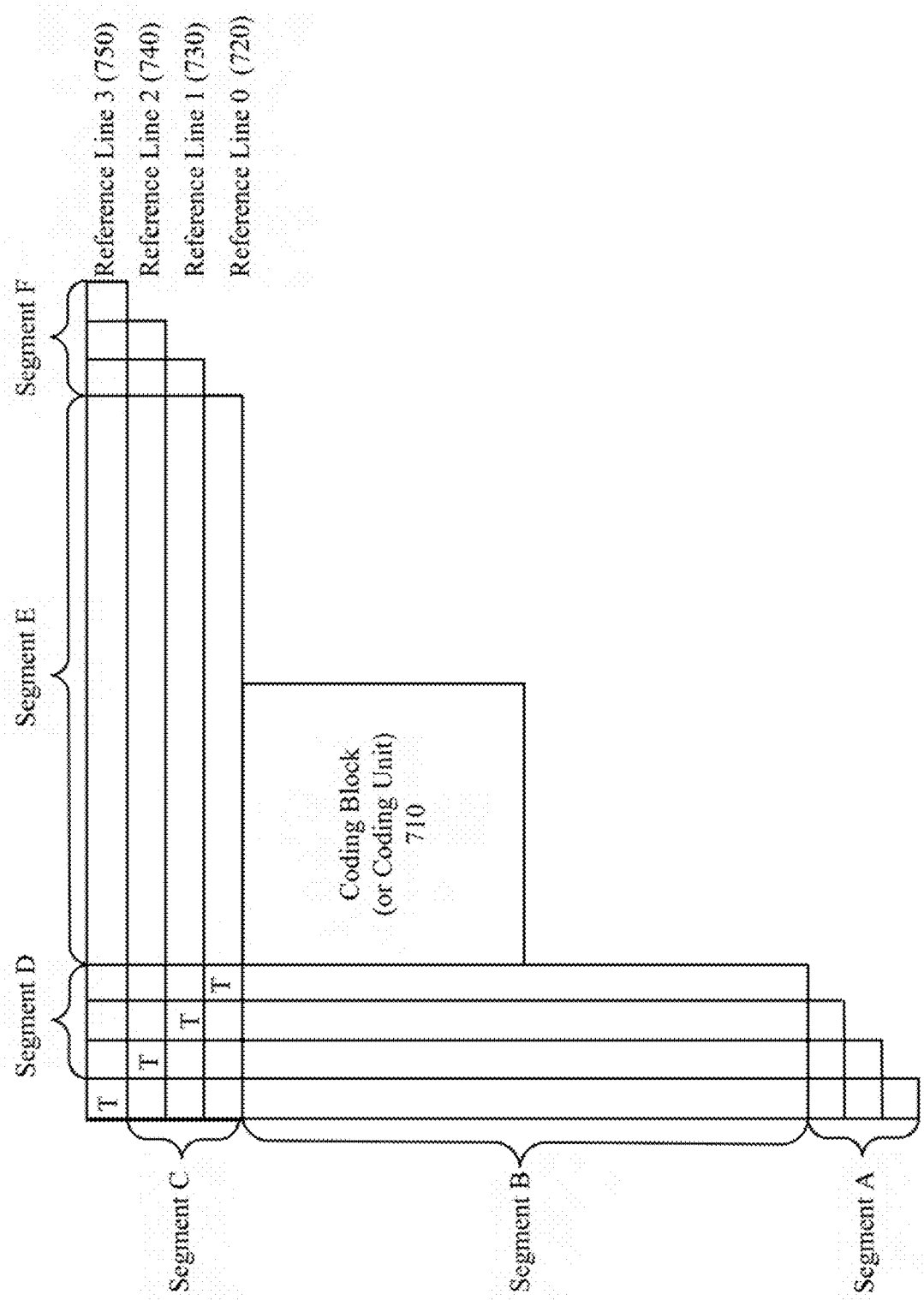
FIG. 7 shows a diagram of multiple reference lines in some examples.

FIG. 7 shows a diagram of multiple reference lines in some examples. In FIG. 7, 4 reference lines of a coding block (710) are shown. The first reference line (720) which is also referred to as reference line 0 includes a row of reference samples immediately above the coding block (710) and a column of reference samples immediately left of the coding block (710). The second reference line (730) which is also referred to as reference line 1 includes a row of reference samples immediately above the first reference line (720) and a column of reference samples immediately left of the first reference line (720). The third reference line (740) which is also referred to as reference line 2 includes a row of reference samples immediately above the second reference line (730) and a column of reference samples immediately left of the second reference line (730). The fourth reference line (750) which is also referred to as reference line 3 includes a row of reference samples immediately above the third reference line (740) and a column of reference samples immediately left of the third reference line (740). Further, each reference line is composed of six segments, such as shown by Segment A to F, together with the top-left reference samples shown by T. In some examples, Segment A and Segment F are padded with the closest samples from Segment B and E, respectively.

In some examples, a technique that is referred to as a template-based multiple reference line intra prediction (TMRL) mode can be used. The TMRL mode includes four aspects.

In some examples, for the first aspect of the TMRL mode, two candidate lists are used, one for reference lines and one for intra prediction modes. In an example, an extended reference line candidate list and an intra-prediction-mode candidate list are used. For example, the extended reference line candidate list includes {1, 3, 5, 7, 12}. The restriction on CTU top row is unchanged. In an example, the size of the intra-prediction-mode candidate list is 10. The construction of the intra-prediction-mode candidate list is similar to MPM. The difference of the intra-prediction-mode candidate to the MPM is that the planar mode is excluded from the intra-prediction-mode candidate list.

In some examples, for the second aspect of the TMRL mode, the TMRL combination list is constructed. In an example, combinations of the extended reference lines and the allowed intra-prediction modes can be constructed for a coding block. Each combination includes a reference line selected from the extended reference line candidate list, and an intra prediction mode selected from the intra-prediction-mode candidate list. In an example, since 5 reference lines are in the extended reference line candidate list of a coding block, and 10 intra prediction modes are in the intra-prediction-mode candidate list of the coding block, then 50 combinations can be constructed for the coding block.

In some examples, the extended reference line starts from reference line 1, the area covered by reference line 0 is used for template matching.

Figure 8:
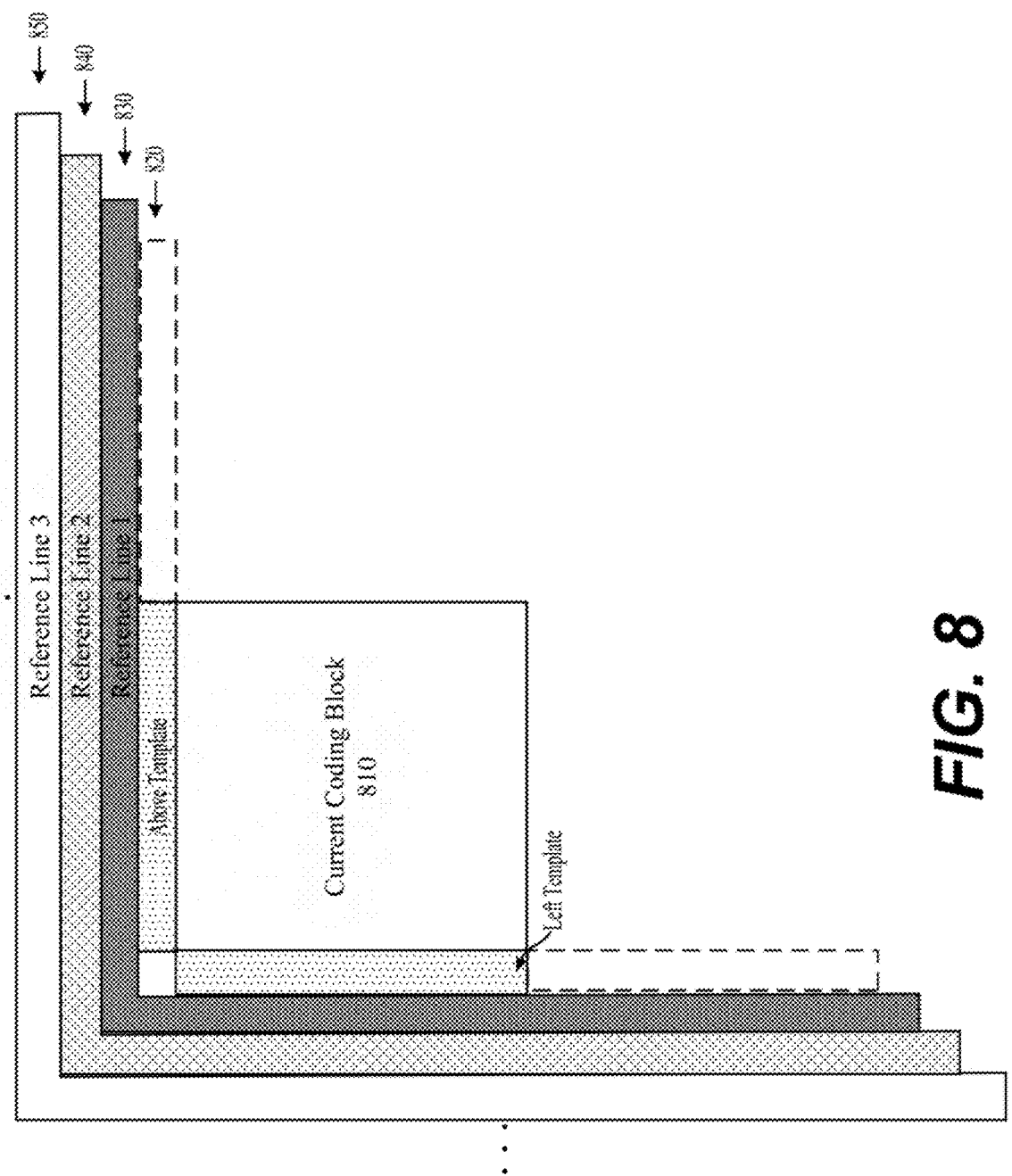
FIG. 8 shows a diagram illustrating the template-based multiple reference line intra prediction mode in some examples.

FIG. 8 shows a diagram illustrating the template-based multiple reference line intra prediction mode in some examples. FIG. 8 shows a current coding block (810) with reference lines, such as reference line 0 (820), reference line 1 (830), reference line 2 (840), and reference line 3 (850) and the like. Based on the area covered by the reference line 0 (820), a template area can be defined, such as an above template, a left template, a template including the above template and the left template, and the like. It is noted that, in some examples, at the time of coding the current coding block (810), the template area has already been reconstructed.

In some examples, for each of the 50 combinations of the extended reference line and the allowed intra prediction modes, a projection of the template area can be generated according to the reference line and the intra prediction mode of the combination. Further, a template matching cost, such as a sum of absolute difference (SAD) cost, is calculated between the projection of the template area and the template area. In an example, the first 20 combinations with the least cost are pruned from the combinations in a cost ascending order to form a combination candidate list.

In some examples, the third aspect of the TMRL is related to signaling of the TMRL. In some examples, such as ECM or VTM, multiple reference lines (MRLs) are combined with the non-planar intra prediction modes from primary MPM list. When an extended reference line is selected, up to 6 context-coded bins and 3 equi-probable (EP) bins can be used to represent a combination of the MRL and MPM index. In some examples, in the TMRL mode, a truncated Golomb-Rice coding with a divisor 4 is employed to code selected combinations from the combination list.

FIG. 9 show a table of the binarization process and the codewords in the TMRL mode in some examples.

In some examples, the fourth aspect of the TMRL is related to encoder side modifications. In an example, encoder side modification is performed to further improve the coding efficiency. In an example, for intra blocks larger than 8×8, more rounds of full rate distortion optimization (RDO) may be allowed to the selected intra prediction modes after comparing the sum of absolute transformed distortion (SATD) cost with a threshold.

Some aspects of the disclosure provide techniques for TMRL.

In the following description, the line index of the nearest reference line of a coding block is 0, the nearest reference line is also referred to as zero reference line or adjacent reference line, and other reference lines are referred to as non-zero reference lines or non-adjacent reference lines.

In the following descriptions, a template may refer to the top neighboring samples, left neighboring samples, right neighboring samples and/or bottom neighboring samples in a specific reference line of a current coding block.

Figure 10:
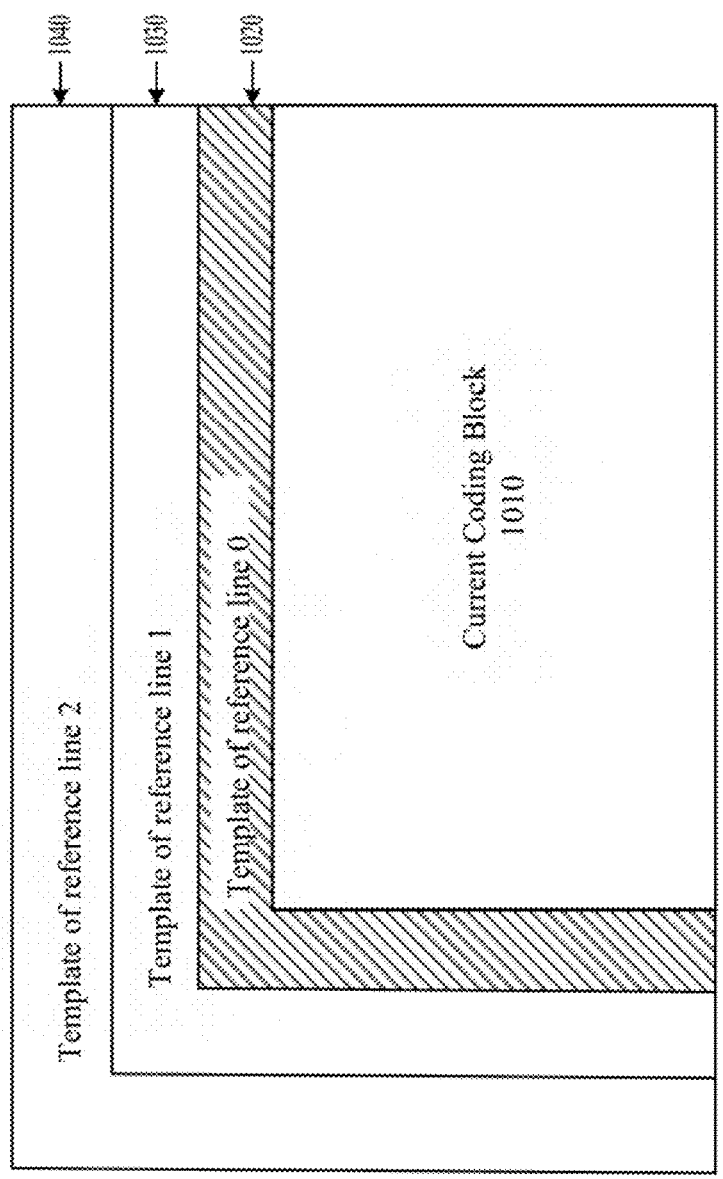
FIG. 10 shows a diagram of templates of reference lines in some examples.

FIG. 10 shows a diagram of templates of reference lines in some examples. In the FIG. 10 example, the template of the reference line 0 is shown by (1020) which is also referred to as template of the current coding block (1010), the template of the reference line 1 is shown by (1030) and the template of the reference line 2 is shown by (1040).

Figure 11:
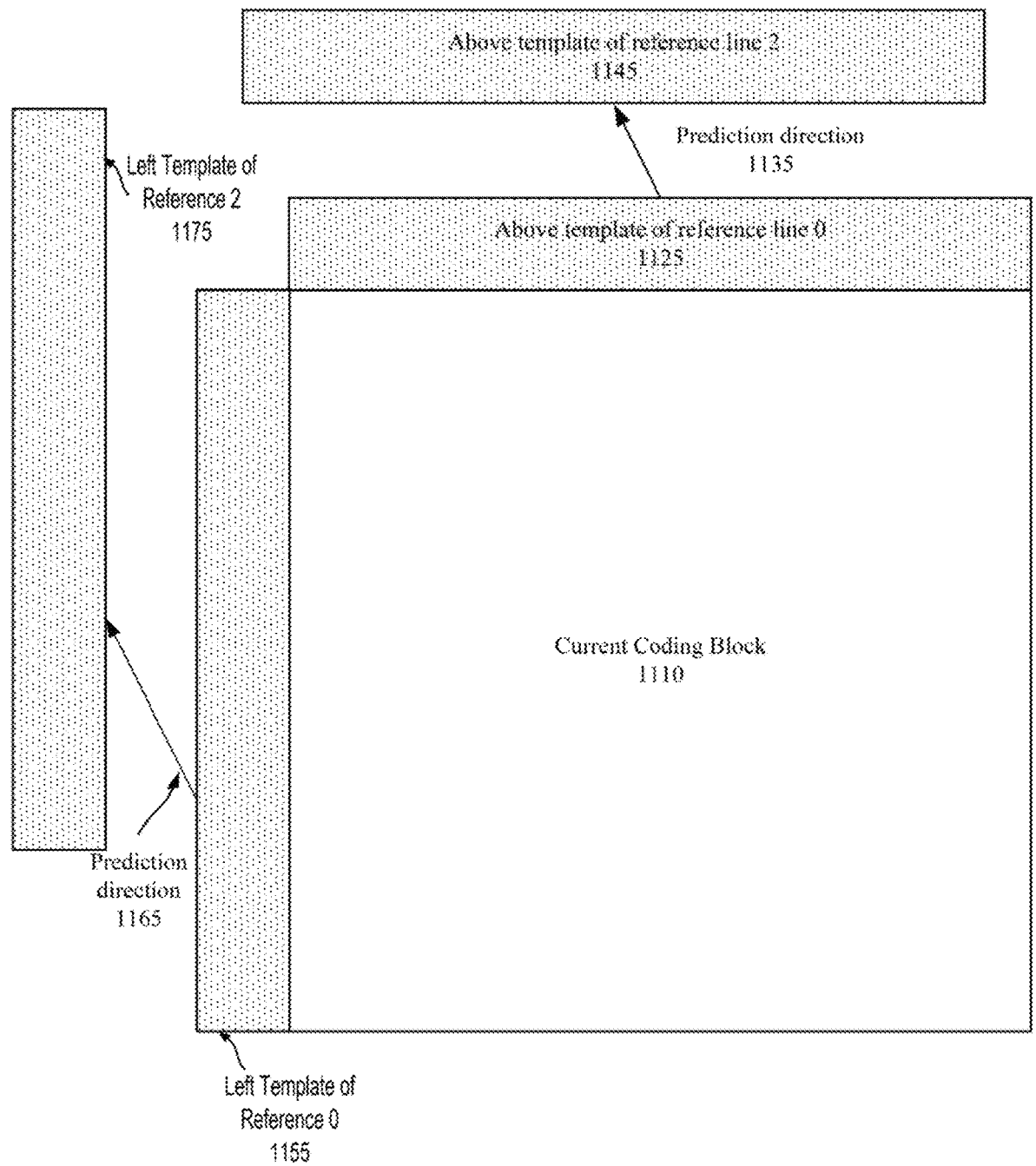
FIG. 11 shows another diagram of templates of reference lines in some examples.

FIG. 11 shows another diagram of templates of reference lines in some examples. In the FIG. 11 example, an above template of the reference line 0 is shown by (1125), which is also reference to as the above template of the current coding block (1110). In an example, according to the prediction direction (1135) which can be indicated by an intra prediction mode, the above template (1125) can be projected to a non-zero reference line. The projected template in the non zero reference line is also referred to as reference template in some examples. For example, based on the prediction direction (1135), the above template (1125) is projected to an above template (1145) of the reference line 2. The above template (1145) is the projection of the above template (1125) in the reference line 2 according to the prediction direction.

In the FIG. 11 example, a left template of the reference line 0 is shown by (1155), which is also referred to as the left template of the current coding block (1110). In an example, according to the prediction direction (1165), the left template (1155) can be projected to a non-zero reference line. The projected template in the non zero reference line is also referred to as reference template in some examples. For example, based on the prediction direction (1165), the left template (1155) is projected to a left template (1175) of the reference line 2. The left template (1175) is the projection of the left template (1155) according to the prediction direction.

According to some aspects of the disclosure, weighting is applied on top of the TMRL method. In some examples, the template of reference line 0 is denoted by $template_0$, the template (also referred to as reference template) of reference line i (i is not zero) is denoted by $template_i$, and a difference of the two templates at entry index x (e.g., sample position x in the template of the reference line 0) is denoted by $template_{delta}(x)$, and can be calculated according to Eq. (1):

$$template_{delta}(x) = template_i(x) - template_0(x) \qquad \text{Eq. (1)}$$

According to some aspects of the disclosure, weightings are applied to each entry of template$_{delta}$ to calculate the cost for the reference template.

In some examples, weighting is applied on each entry in the template$_{delta}$ before calculating the template matching cost, such as according to Eq. (2):

$$\text{cost} = \Sigma_{x=0}^{n} f(\text{weight}(x) \cdot \text{template}_{delta}(x)) \quad \text{Eq. (2)}$$

where weight(x) denotes the weight applied on the entry located at position x in the template, f is the cost function, including, but not limited to sum of absolute difference (SAD), sum of squared error (SSE), mean squared error (MSE), sum of absolute transformed difference (SATD) and the like.

In an embodiment, the weight value for the entry x (also referred to as sample position x) depends on sample values in the template of reference line 0 and the reference template of reference line i, and sample values of adjacent positions to the entry x.

In another embodiment, the weight value for the entry x depends on a difference between sample values in the template of reference line 0 and the reference template of reference line i located at position x and adjacent positions, such as position x−1 and/or position x+1.

In another embodiment, the weight value for the entry x depends on gradient value of the samples in the template of reference line 0 and the reference template of reference line i located at position x.

In some examples, depending on the prediction direction, partial of the templates are used for calculating the template matching cost.

In an embodiment, when prediction direction is vertical like, for example, reference samples come from above neighboring reconstructed samples, such as above templates can be used for calculating the cost. In an example, the index of the vertical direction (vertical intra prediction mode) is 50, and an absolute difference of the index of the prediction direction (intra prediction mode) to the index of the vertical direction is less than a threshold (e.g., 6), then the above templates can be used for calculating the template matching cost.

In another embodiment, when prediction direction is horizontal like, i.e., reference samples come from left neighboring reconstructed samples, such as left templates are used. In an example, the index of the horizontal direction (horizontal intra prediction mode) is 18, and an absolute difference of the index of the prediction direction (intra prediction mode) to the index of the horizontal direction is less than a threshold (e.g., 6), then the left templates can be used for calculating the template matching cost.

In another embodiment, when prediction direction is between horizontal direction and vertical direction, i.e., reference samples come from both above and left neighboring reconstructed samples, such as the above and left templates are used for calculating the template matching cost.

In some examples, after the reference samples are reconstructed, a smoothing process may be applied to the reference samples. In some embodiments, the reconstructed reference samples before the smoothing process are used to calculate the template matching cost.

In some embodiments, after the template matching costs associated with combinations of the candidate reference lines and the intra prediction modes are calculated, the template matching costs that are in a predefined range [a, b] are selected, and the combinations of the candidate reference lines and intra prediction modes associated with the selected template matching costs in the predefined range [a, b] are determined to be available for current coding block. In an example, both a and b are values greater than 0.

In some embodiments, when the number of combinations of the candidate reference lines and intra prediction modes with template matching cost values within [a, b] is less than N, N indicates a required number of available combinations, then combinations of the candidate reference lines and intra prediction modes with template matching cost values outside the range of [a, b] can be added to the available combinations to make the number of available combinations to be N.

In some embodiments, when the number of combinations of the candidate reference lines and intra prediction modes with template matching cost values within [a, b] is greater than N, N indicate a required number of available combinations, then only the first N combinations of the candidate reference lines and intra prediction modes that are closer to reference line 0 (or with lower template matching cost) are selected as the available combinations.

According to an aspect of the disclosure, to calculate the template matching cost between two reference lines, such as reference line i and reference line j, interpolation may be applied by projecting integer samples of a template in reference line i to reference line j, or projecting integer samples of a template in reference line j to reference line i.

In some examples, when a projection point is at a fractional position between two integer samples in a reference line, interpolation is applied to generate fractional sample value.

In some examples, the interpolation method may be the same as used in the interpolation process in angular (directional) intra prediction.

In some examples, the interpolation method may be a different interpolation compared to the interpolation used in angular (directional) intra prediction. For example, the interpolation method can include bilinear interpolation, 4-tap cubic interpolation, nearest integer and the like.

Figure 12:
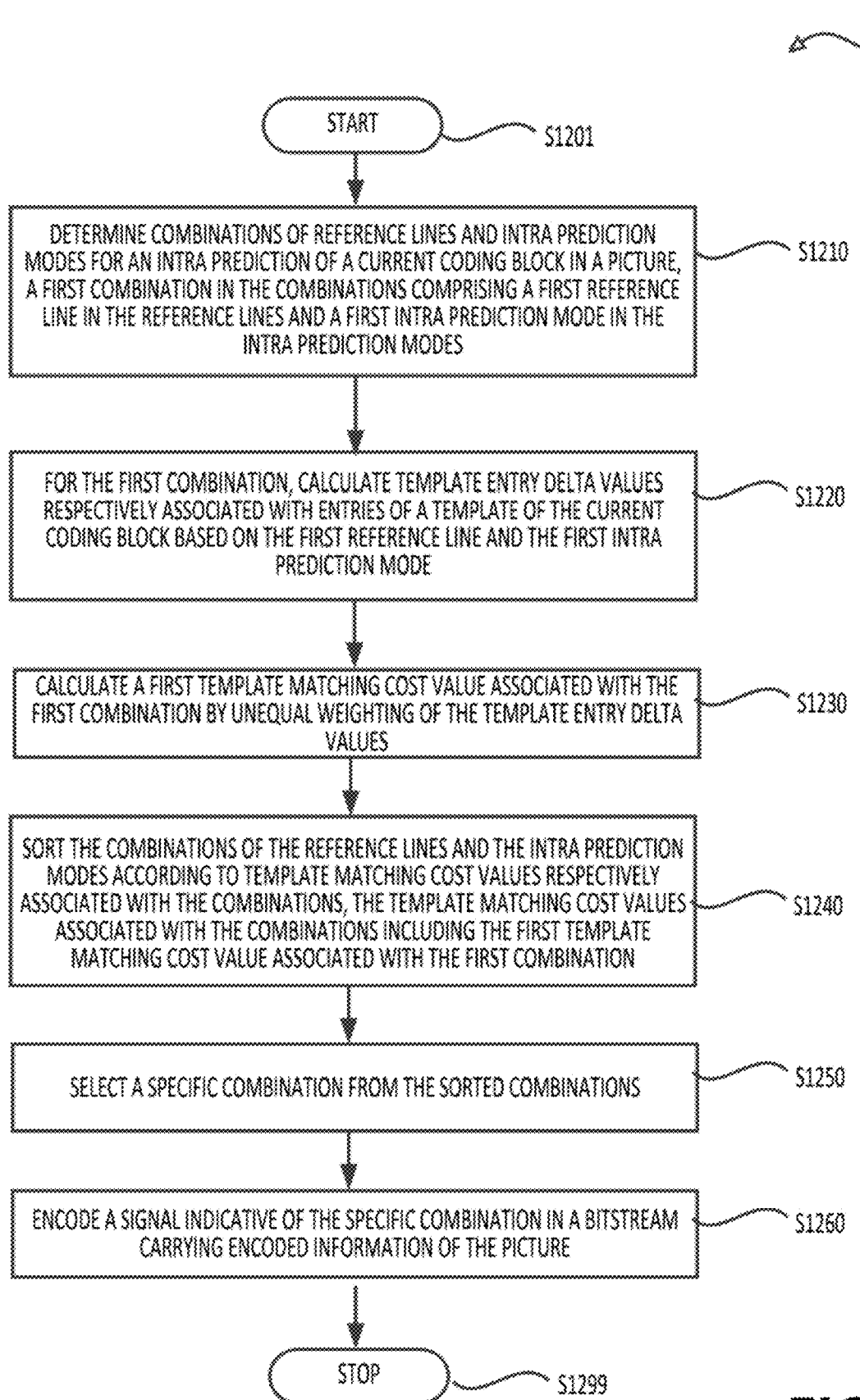
FIG. 12 shows a flow chart outlining a process according to some embodiment of the disclosure.

FIG. 12 shows a flow chart outlining a process (1200) according to an embodiment of the disclosure. The process (1200) can be used in a video encoder. In various embodiments, the process (1200) is executed by processing circuitry, such as the processing circuitry that performs functions of the video encoder (103), the processing circuitry that performs functions of the video encoder (303), and the like. In some embodiments, the process (1200) is implemented in software instructions, thus when the processing circuitry executes the software instructions, the processing circuitry performs the process (1200). The process starts at (S1201) and proceeds to (S1210).

At (S1210), combinations of reference lines and intra prediction modes for an intra prediction of a current coding block in a picture are determined. In an example, the current coding block is determined to be coded by intra prediction. A first candidate list of reference lines is determined and a second candidate list of intra prediction modes are determined. Then, combinations of the reference lines and the intra prediction modes are determined. Each combination in the combinations includes a reference line in the reference lines and an intra prediction mode in the intra prediction modes. For example, a first combination in the combinations includes a first reference line in the reference lines and a first intra prediction mode in the intra prediction modes.

At (S1220), for the first combination, template entry delta values respectively associated with entries of the template of the current coding block are calculated based on the first reference line and the first intra prediction mode.

At (S1230), a first template matching cost value associated with the first combination is calculated by unequal weighting of the template entry delta values.

At (S1240), the combinations of the reference lines and the intra prediction modes are sorted according to template matching cost values respectively associated with the combinations. The template matching cost values associated with the combinations includes the first template matching cost value associated with the first combination.

At (S1250), a specific combination is selected from the sorted combinations. For example, the specific combination is selected based on rate-distortion optimization.

At (S1260), a signal indicative of the specific combination is encoded in a bitstream carrying encoded information of the picture.

In some embodiments, the template of the current coding block includes neighboring samples (e.g., in the reference line 0) to the current coding block as the entries. A reference template in the first reference line corresponding to the template of the current coding block is determined based on the first intra prediction mode, the reference template includes reference entries respectively corresponding to the entries of the template.

In some embodiments, a first template entry delta value is calculated as a difference between a first entry in the entries of the template and a first reference entry in the reference entries of the reference template, the first reference entry corresponds to the first entry. In some examples, a weight for weighting the first template entry delta value is determined based on at least the first entry and the first reference entry.

In some examples, the weight for weighting the first template entry delta value is determined based on the first entry, the first reference entry and one or more adjacent reference entries of the first reference entry.

In some examples, the weight for weighting the first template entry delta value is determined based on the first template entry delta value and one or more template entry delta values associated with adjacent entries of the template.

In some examples, the weight for weighting the first template entry delta value is determined based on at least a first gradient value at the first entry and/or a second gradient value at the first reference entry.

In some examples, a portion of neighboring samples in the reference line 0 is used for calculating the template matching cost value. In an example, the template matching cost value is calculated according to an above template (e.g., including above neighboring samples) of the current coding block. In another example, the template matching cost values is calculated according to a left template (e.g., including left neighboring samples) of the current coding block.

In some embodiments, a subset of the combinations is determined based on a predefined range for the template matching cost values, and the specific combination is selected from the subset of the combinations.

In some examples, a first subset of the combinations with first template matching cost values in the predefined range is determined. In an example, in response to a first number of combinations in the first subset of the combinations being less than a specific number specifying a number requirement of available combinations, one or more second combinations with second template matching cost values out of the predefined range are selected, the first subset and the one or more second combinations form the subset of the combinations with the number of combinations in the subset being equal to the specific number.

In another example, in response to a first number of combinations in the first subset of the combinations being greater than the specific number specifying the number requirement, the subset of the combinations is selected from the first subset of the combinations, a number of combinations in the subset being equal to the specific number. For example, the subset of the combinations with lowest template matching cost values is selected from the first subset. In another example, the subset of the combinations with closest reference lines to the template is selected from the first subset.

In some examples, the template is in a second reference line, a projection point of an entry of the template is at a fractional position between two samples in the first reference line, a reference entry associated with the entry of the template is generated according to an interpolation based on at least the two samples.

Then, the process proceeds to (S1299) and terminates.

The process (1200) can be suitably adapted. Step(s) in the process (1200) can be modified and/or omitted. Additional step(s) can be added. Any suitable order of implementation can be used.

Figure 13:
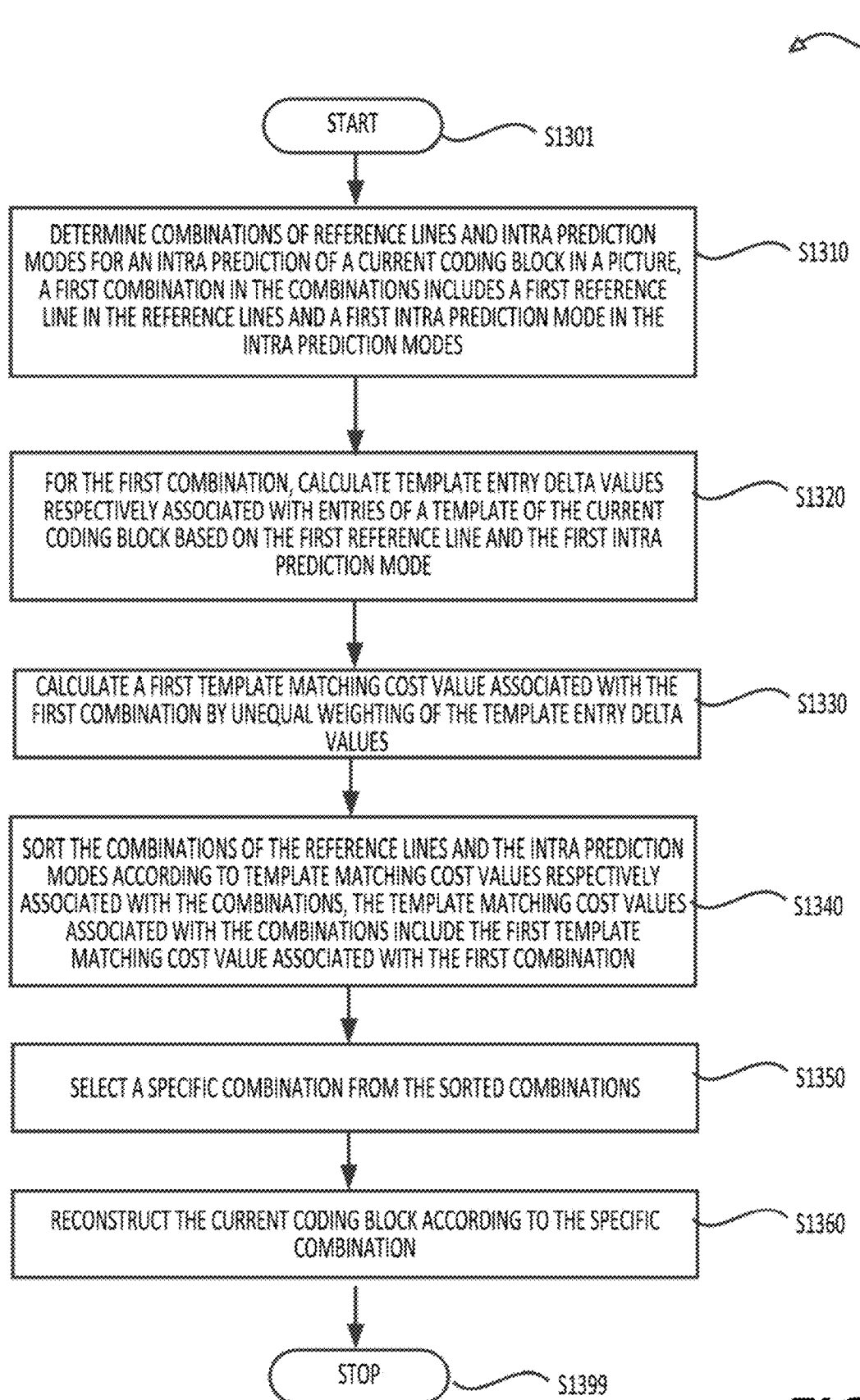
FIG. 13 shows a flow chart outlining another process according to some embodiment of the disclosure.

FIG. 13 shows a flow chart outlining a process (1300) according to an embodiment of the disclosure. The process (1300) can be used in a video decoder. In various embodiments, the process (1300) is executed by processing circuitry, such as the processing circuitry that performs functions of the video decoder (110), the processing circuitry that performs functions of the video decoder (210), and the like. In some embodiments, the process (1300) is implemented in software instructions, thus when the processing circuitry executes the software instructions, the processing circuitry performs the process (1300). The process starts at (S1301) and proceeds to (S1310).

At (S1310), combinations of reference lines and intra prediction modes for an intra prediction of a current coding block in a picture are determined. In an example, a first candidate list of reference lines is determined and a second candidate list of intra prediction modes are determined. Then, combinations of the reference lines and the intra prediction modes are determined. Each combination in the combinations includes a reference line in the reference lines and an intra prediction mode in the intra prediction modes. For example, a first combination in the combinations includes a first reference line in the reference lines and a first intra prediction mode in the intra prediction modes.

At (S1320), for the first combination, template entry delta values respectively associated with entries of the template of the current coding block are calculated based on the first reference line and the first intra prediction mode.

At (S1330), a first template matching cost value associated with the first combination is calculated by unequal weighting of the template entry delta values.

At (S1340), the combinations of the reference lines and the intra prediction modes are sorted according to template matching cost values respectively associated with the combinations. The template matching cost values associated with the combinations includes the first template matching cost value associated with the first combination.

At (S1350), a specific combination is selected from the sorted combinations. In some examples, a signal indicative an index of the specific combination in the sorted combinations is decoded, and the specific combination is selected based on the decoded signal.

At (S1360), the current coding block is reconstructed according to the specific combination which includes a reference line and an intra prediction mode.

In some embodiments, the template of the current coding block includes neighboring samples to the current coding block as the entries. A reference template in the first reference line corresponding to the template of the current coding block is determined based on the first intra prediction mode, the reference template includes reference entries respectively corresponding to the entries of the template.

In some embodiments, a first template entry delta value is calculated as a difference between a first entry in the entries of the template and a first reference entry in the reference entries of the reference template, the first reference entry corresponds to the first entry. In some examples, a weight for weighting the first template entry delta value is determined based on at least the first entry and the first reference entry.

In some examples, the weight for weighting the first template entry delta value is determined based on the first entry, the first reference entry and one or more adjacent reference entries of the first reference entry.

In some examples, the weight for weighting the first template entry delta value is determined based on the first template entry delta value and one or more template entry delta values associated with adjacent entries of the template.

In some examples, the weight for weighting the first template entry delta value is determined based on at least a first gradient value at the first entry and/or a second gradient value at the first reference entry.

In some examples, a portion of neighboring samples in the reference line 0 is used for calculating the template matching cost value. In an example, the template matching cost value is calculated according to an above template (e.g., including above neighboring samples) of the current coding block. In another example, the template matching cost values is calculated according to a left template (e.g., including left neighboring samples) of the current coding block.

In some embodiments, a subset of the combinations is determined based on a predefined range for the template matching cost values, and the specific combination is selected from the subset of the combinations.

In some examples, a first subset of the combinations with first template matching cost values in the predefined range is determined. In an example, in response to a first number of combinations in the first subset of the combinations being less than a specific number specifying a number requirement of available combinations, one or more second combinations with second template matching cost values out of the predefined range are selected, the first subset and the one or more second combinations form the subset of the combinations with the number of combinations in the subset being equal to the specific number.

In another example, in response to a first number of combinations in the first subset of the combinations being greater than the specific number specifying the number requirement, the subset of the combinations is selected from the first subset of the combinations, a number of combinations in the subset being equal to the specific number. For example, the subset of the combinations with lowest template matching cost values is selected from the first subset. In another example, the subset of the combinations with closest reference lines to the template is selected from the first subset.

In some examples, the template is in a second reference line, a projection point of an entry of the template is at a fractional position between two samples in the first reference line, a reference entry associated with the entry of the template is generated according to an interpolation based on at least the two samples.

Then, the process proceeds to (S1399) and terminates.

The process (1300) can be suitably adapted. Step(s) in the process (1300) can be modified and/or omitted. Additional step(s) can be added. Any suitable order of implementation can be used.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
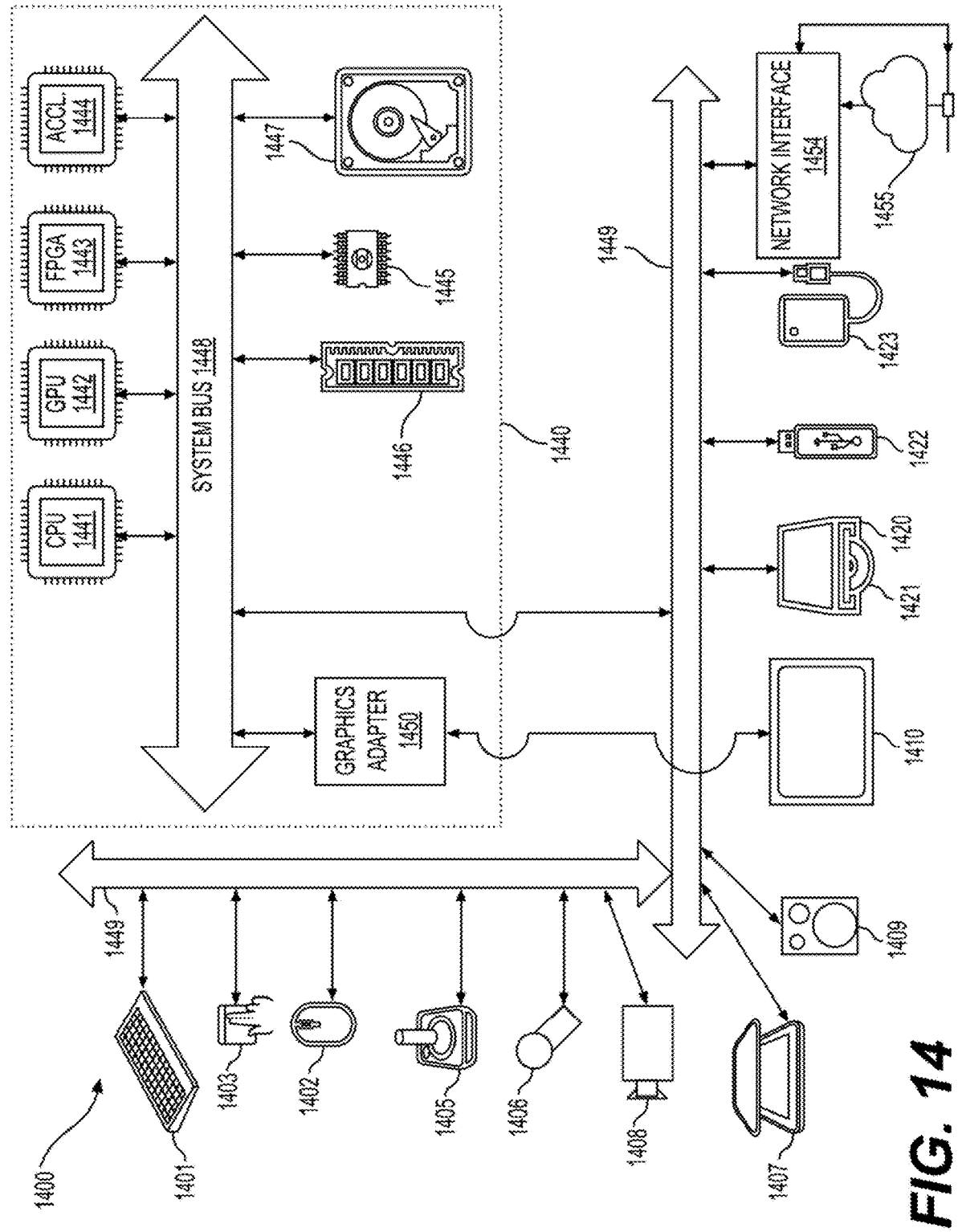
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:
1. A method of video decoding, comprising:
receiving a video bitstream comprising a current coding block in a picture;
determining that the current coding block is coded in a template-based multiple reference line intra prediction (TMRL) mode;

determining combinations of reference lines and intra prediction modes for an intra prediction of the current coding block, a first combination in the combinations comprising a first reference line in the reference lines and a first intra prediction mode in the intra prediction modes, the first reference line being a non-adjacent reference line;

for the first combination, calculating template entry delta values respectively associated with entries of a template of the current coding block, the template of the current coding block being in an adjacent reference line, each of the template entry delta values being equal to a difference value between (i) an entry at a respective position in a reference template that is determined by the first reference line and the first intra prediction mode and (ii) an entry at the respective position in the template of the current coding block;

calculating a first template matching cost value associated with the first combination based on weighted template entry delta values by unequally weighting of the template entry delta values;

ordering the combinations of the reference lines and the intra prediction modes according to template matching cost values respectively associated with the combinations, the template matching cost values associated with the combinations including the first template matching cost value associated with the first combination;

selecting a specific combination from the ordered combinations; and reconstructing the current coding block according to the specific combination.

2. The method of claim 1, wherein the template of the current coding block comprises neighboring samples to the current coding block as the entries, and the method comprises:

determining the reference template in the first reference line corresponding to the template of the current coding block based on the first intra prediction mode, the reference template comprising reference entries respectively corresponding to the entries of the template.

3. The method of claim 2, further comprising:

calculating a first template entry delta value as a difference between a first entry in the entries of the template and a first reference entry in the reference entries of the reference template, the first reference entry corresponding to the first entry; and determining a weight for weighting the first template entry delta value based on at least the first entry and the first reference entry.

4. The method of claim 3, further comprising:

determining the weight for weighting the first template entry delta value based on the first entry, the first reference entry and one or more adjacent reference entries of the first reference entry.

5. The method of claim 3, further comprising:

determining the weight for weighting the first template entry delta value based on the first template entry delta value and one or more template entry delta values associated with adjacent entries of the template.

6. The method of claim 3, further comprising:

determining the weight for weighting the first template entry delta value based on at least a first gradient value at the first entry and/or a second gradient value at the first reference entry.

7. The method of claim 2, further comprising:

calculating the first template matching cost value associated with the first combination based on a portion of the template.

8. The method of claim 7, further comprising:

calculating the first template matching cost value based on an above template that includes above neighboring samples of the current coding block.

9. The method of claim 7, further comprising:

calculating the first template matching cost value based on a left template that includes left neighboring samples of the current coding block.

10. A method of video encoding, comprising:

determining that a current coding block in a current picture is to be coded in a template-based multiple reference line intra prediction (TMRL) mode;

determining combinations of reference lines and intra prediction modes for an intra prediction of the current coding block, a first combination in the combinations comprising a first reference line in the reference lines and a first intra prediction mode in the intra prediction modes, the first reference line being a non-adjacent reference line;

for the first combination, calculating template entry delta values respectively associated with entries of a template of the current coding block, the template of the current coding block being in an adjacent reference line, each of the template entry delta values being equal to a difference value between (i) an entry at a respective position in a reference template that is determined by the first reference line and the first intra prediction mode and (ii) an entry at the respective position in the template of the current coding block;

calculating a first template matching cost value associated with the first combination based on weighted template entry delta values by unequally weighting of the template entry delta values;

ordering the combinations of the reference lines and the intra prediction modes according to template matching cost values respectively associated with the combinations, the template matching cost values associated with the combinations including the first template matching cost value associated with the first combination;

selecting a specific combination from the ordered combinations; and encoding the current coding block according to the specific combination.

11. The method of claim 10, wherein the template of the current coding block comprises neighboring samples to the current coding block as the entries, and the method comprises:

determining the reference template in the first reference line corresponding to the template of the current coding block based on the first intra prediction mode, the reference template comprising reference entries respectively corresponding to the entries of the template.

12. The method of claim 11, further comprising:

calculating a first template entry delta value as a difference between a first entry in the entries of the template and a first reference entry in the reference entries of the reference template, the first reference entry corresponding to the first entry; and determining a weight for weighting the first template entry delta value based on at least the first entry and the first reference entry.

13. A method of processing visual media data, the method comprising:

processing a bitstream of the visual media data according to a format rule, wherein:

the bitstream includes coded information of a current coding block in a picture, the current coding block being coded in a template-based multiple reference line intra prediction (TMRL) mode; and the format rule specifies that:

combinations of reference lines and intra prediction modes are determined for an intra prediction of the current coding block, a first combination in the combinations comprising a first reference line in the reference lines and a first intra prediction mode in the intra prediction modes, the first reference line being a non-adjacent reference line;

for the first combination, template entry delta values are calculated respectively associated with entries of a template of the current coding block, the template of the current coding block being in an adjacent reference line, each of the template entry delta values being equal to a difference value between (i) an entry at a respective position in a reference template that is determined by the first reference line and the first intra prediction mode and (ii) an entry at the respective position in the template of the current coding block;

a first template matching cost value associated with the first combination is calculated based on weighted template entry delta values by unequally weighting of the template entry delta values;

the combinations of the reference lines and the intra prediction modes are ordered according to template matching cost values respectively associated with the combinations, the template matching cost values associated with the combinations including the first template matching cost value associated with the first combination;

a specific combination is selected from the ordered combinations; and the current coding block is processed according to the specific combination.

* * * * *